(12) United States Patent
Watanabe

(10) Patent No.: US 6,515,722 B1
(45) Date of Patent: *Feb. 4, 2003

(54) LIQUID CRYSTAL DISPLAY

(75) Inventor: Tomoyuki Watanabe, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 120 days.

This patent is subject to a terminal disclaimer.

(21) Appl. No.: 09/586,687

(22) Filed: Jun. 1, 2000

Related U.S. Application Data

(63) Continuation of application No. 09/159,250, filed on Sep. 23, 1998, now Pat. No. 6,104,453.

(30) Foreign Application Priority Data

Sep. 30, 1997 (JP) .............................................. 9-265314

(51) Int. Cl.$^7$ ............................................ G02F 1/1335
(52) U.S. Cl. ......................................... 349/61; 349/63
(58) Field of Search .............................. 349/61, 65, 96, 349/11; 362/26, 31; 385/129, 146, 901

(56) References Cited

U.S. PATENT DOCUMENTS

| | | | |
|---|---|---|---|
| 5,040,878 A | 8/1991 | Eichenlaub | 350/345 |
| 5,473,454 A | 12/1995 | Blanchard | 359/69 |
| 5,608,550 A * | 3/1997 | Epstein et al. | 349/57 |
| 5,671,994 A | 9/1997 | Tai et al. | 362/31 |
| 5,953,089 A | 9/1999 | Hiji et al. | 349/112 |
| 6,008,871 A * | 12/1999 | Okumura | 349/61 |
| 6,104,453 A * | 8/2000 | Watanabe | 349/61 |
| 6,104,454 A * | 8/2000 | Hiyama et al. | 349/65 |

FOREIGN PATENT DOCUMENTS

JP     2699853     9/1997

\* cited by examiner

*Primary Examiner*—William L. Sikes
*Assistant Examiner*—P. R. Akkapeddi
(74) *Attorney, Agent, or Firm*—Brinks Hofer Gilson & Lione

(57) ABSTRACT

A liquid crystal display has s a liquid crystal cell having a front surface serving as a viewing-side surface and a back surface, a reflecting film is attached to the back surface of the liquid crystal cell, and a light guide panel having a first major surface provided with minute irregularities and a second major surface finished in a smooth flat plane is disposed on the front surface of the liquid crystal cell with the second major surface thereof finished in a smooth flat plane in contact with the front surface of the liquid crystal cell. A light source is disposed beside aside surface of the light guide panel. When the liquid crystal display is used in a dim environment, the light source is turned on. Light emitted by the light source is guided and scattered toward the reflecting film by the light guide panel, so that the light can be transmitted efficiently by the light guide panel and the liquid crystal cell to the reflecting film.

31 Claims, 3 Drawing Sheets

LIQUID CRYSTAL DISPLAY

This is a continuation of allowed U.S. patent application Ser. No. 09/159,250 now U.S. Pat. No. 6,104,453 filed Sep. 23, 1998.

BACKGROUND OF THE INVENTION

1. Field of the Invention

The present invention relates to a liquid crystal display for displaying information on a television system, on automobiles and on toys.

2. Description of the Related Art

Liquid crystal displays are classified into reflection type crystal displays, semitransparent type liquid crystal displays and transparent type liquid crystal displays.

A conventional reflection type liquid crystal display shown in FIG. 8 has a liquid crystal cell 21 constructed by sealing a liquid crystal, not shown, between two rectangular insulating substrates 22 and 23 made of glass, and attaching polarizers 24 and 25 to the respective outer surfaces of the insulating substrates 22 and 23, respectively. A reflecting film 26 of a transparent resin provided with a reflecting layer 26a of silver on one surface thereof is attached to the back surface of the liquid crystal cell 21, and a protective film 27 of a plastic material is attached to the back surface of the reflecting film 26.

External light falls on the front surface, i.e., the viewing-side surface, of the liquid crystal cell 21, the external light is reflected by the reflecting film 26 to form a picture on the liquid crystal cell 21. Accordingly, the visibility of the reflection type liquid crystal display is unsatisfactory in a dim environment because light of high intensity is unavailable in a dim environment.

A conventional semitransparent type liquid crystal display shown in FIG. 9 has a liquid crystal cell 21 constructed by sealing a liquid crystal, not shown, between two rectangular insulating substrates 22 and 23 made of glass, and attaching polarizers 24 and 25 to the respective outer surfaces of the insulating substrates 22 and 23, respectively. A reflecting film 28 of silver capable of transmitting and reflecting light is deposited by evaporation on the back surface of the lower polarizer 25, and an electroluminescent panel (hereinafter referred to as "EL panel") 29 serving as a light source is attached to the back surface of the reflecting film 28.

When the semitransparent type liquid crystal display is used in good light, external light falls on the front surface, i.e., the viewing-side surface, of the liquid crystal cell 21, the external light is reflected by the reflecting film 28 to form a picture on the liquid crystal cell 21. When the semitransparent type liquid crystal display is used in a dim environment, the EL panel 29 is energized, light emitted by the EL panel 29 is transmitted by the reflecting film 28 to form a picture on the liquid crystal cell 21. The light emitted by the EL panel 29 is attenuated while the same is transmitted by the reflecting film 28. Consequently, the illuminating efficiency of the EL panel 29 to the liquid crystal cell 21 is low and satisfactory pictures cannot be displayed.

A conventional transparent type liquid crystal display shown in FIG. 10 has a liquid crystal cell 21 constructed by sealing a liquid crystal, not shown, between two rectangular insulating substrates 22 and 23 of glass, and attaching polarizers 24 and 25 to the respective outer surfaces of the insulating substrates 22 and 23, respectively. A light guide panel 30 of a transparent resin, such as a transparent acrylic resin, provided in one surface thereof with irregularities formed at pitches on the order of 300 $\mu$m is disposed on the back surface of the lower polarizer 25 with the surface provided with the irregularities in contact with the back surface of the lower polarizer 25 to guide light emitted by a light source 31, such as a cold cathode discharge tube.

When displaying pictures on the liquid crystal display, the light source 31 is turned on, light emitted by the light source 31 is guided by the light guide panel 30, the light is scattered by the irregularities of the light guide panel 30 into the liquid crystal cell 21 to form a picture on the liquid crystal cell 21. Glaring light scattered by the light guide panel 30 falls directly on the eyes of the viewer, spoiling the quality of the picture. Since the pitches of the irregularities of the light guide panel 30 are as large as about 300 $\mu$m, the irregularities are visible and spoil the quality of pictures displayed on the liquid crystal display.

The visibility of the conventional reflection type liquid crystal display is unsatisfactory in a dim environment because bright light is unavailable in a dim environment. Light emitted by the EL panel 29 of the conventional semitransparent type liquid crystal display is attenuated by the reflecting film 29 and hence the EL panel 29 is unable to illuminate the liquid crystal cell 21 efficiently. Since glaring light scattered by the light guide panel 30 of the conventional transparent type liquid crystal display impinges directly on the eyes of the viewer, spoiling the quality of pictures and since the pitches of the irregularities of the light guide panel 30 are as large as about 300 $\mu$m, the irregularities are visible and spoil the quality of pictures displayed on the conventional transparent type liquid crystal display

SUMMARY OF THE INVENTION

Accordingly, it is an object of the present invention to provide a liquid crystal display capable of clearly displaying pictures in sufficient brightness regardless of the ambient brightness and of preventing glare.

According to a first aspect of the present invention, a liquid crystal display comprises: a liquid crystal cell having a front surface serving as a viewing-side surface, and a back surface; a light guide panel having a first major surface provided with minute irregularities and a second major surface finished in a smooth flat plane, and disposed on the front surface of the liquid crystal cell with the second major surface thereof finished in a smooth flat plane in contact with the front surface of the liquid crystal cell; a light source formed of a cold cathod discharge tube and disposed near the light guide panel; and a reflecting film attached to the back surface of the liquid crystal cell.

The light source is disposed beside a side surface of the light guide panel, and the irregularities of the light guide panel are formed at a pitch in the range of 1 to 100 $\mu$m.

The irregularities may be ridges extended along lines substantially parallel to the side surface of the light guide panel and having a triangular cross section.

The irregularities may be a plurality of elliptic projections arranged along lines substantially parallel to the side surface of the light guide panel.

The elliptic projections may be arranged with their major axes extended along lines substantially parallel to the side surface of the light guide panel, and the length of the major axes of the elliptic projections may be in the range of 1 to 100 $\mu$m.

Flat surfaces may be formed between the adjacent ridges, respectively.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 9:
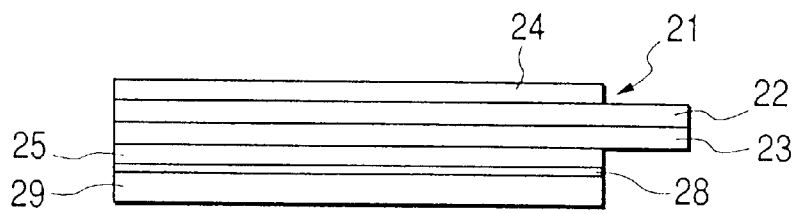
FIG. 9 is a typical side view of a conventional semitransparent type liquid crystal display.
Figure 10:
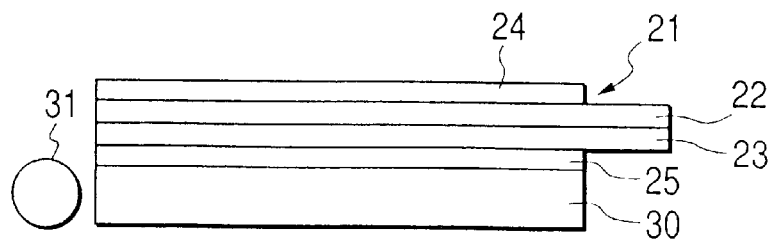
FIG. 10 is a typical side view of a conventional transparent type liquid crystal display.

Referring to FIGS. 1 to 4, a liquid crystal display in a preferred embodiment according to the present invention has a liquid crystal cell 1 constructed by sealing a liquid crystal, not shown, between a pair of rectangular insulating substrates 2 and 3 of glass, and attaching polarizers 4 and 5 to the respective outer surfaces of the insulating substrates 2 and 3, respectively. A reflecting film 6 of a transparent resin provided with a reflecting layer 6a of silver on one surface thereof is attached to the back surface of the liquid crystal cell 1. The reflecting film 6 may be sandwiched between the insulating substrates 2 and 3 of the liquid crystal cell 1 and the polarizer 5 may be omitted. The reflecting film 6 may be substituted by a reflecting layer of silver formed, similarly to the reflecting film 28 shown in FIG. 9, on the back surface of the polarizer 5. A protective film 7 of a plastic material is attached to the back surface of the reflecting film 6.

Figure 1:
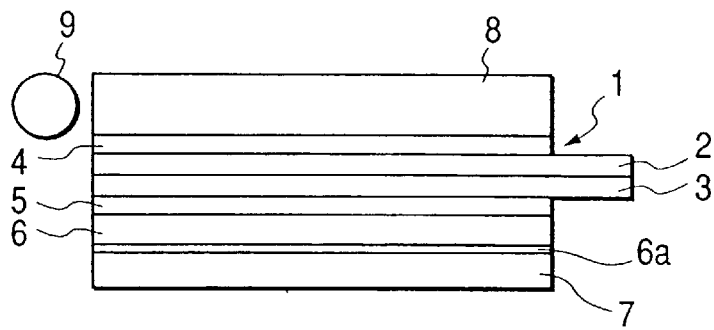
FIG. 1 is a typical side view of a liquid crystal display in a preferred embodiment according to the present invention.
Figure 2:
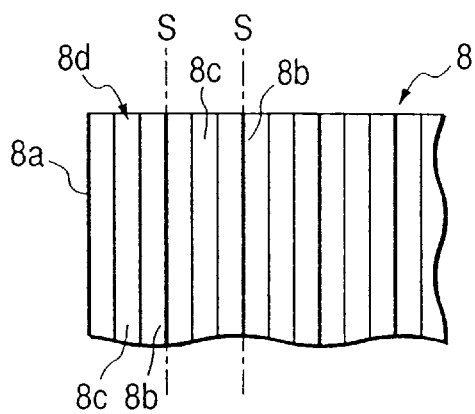
FIG. 2 is a fragmentary plan view of a light guide panel included in the liquid crystal display of FIG. 1.
Figure 3:
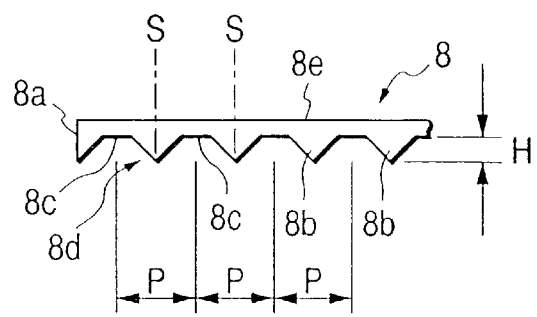
FIG. 3 is a fragmentary side view of the light guide panel of FIG. 2.
Figure 4:
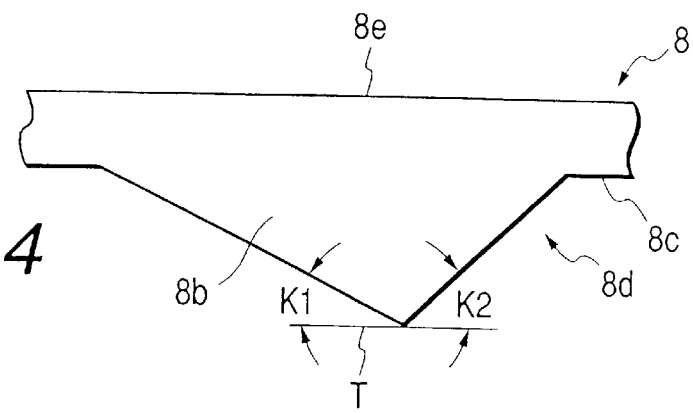
FIG. 4 is an enlarged fragmentary sectional view of the light guide panel of FIG. 2.

A light guide panel 8 is disposed contiguously with the front surface of the liquid crystal cell 1, and a light source 9, such as a cold cathode discharge tube, is disposed near one side 8a of the light guide panel 8. As shown in FIGS. 2 to 4, the light guide panel 8 is provided in its front surface with irregularities 8d having ridges 8b having a triangular cross section, and furrows formed between the adjacent ridges 8b and having flat bottom surfaces 8c, respectively. The light guide panel 8 has a flat back surface 8e. The ridges 8b are arranged at a pitch P in the range of 1 to 100 $\mu$m and have ridge lines substantially parallel to one side 8a of the light guide panel 8. The height H of the ridges 8b from the flat bottom surfaces 8c is increased gradually with distance from the side 8a of the light guide panel 8 near the light source 9 so that luminous flux surface density is uniform over the surface of the light guide panel 8.

Referring to FIG. 4, an angle K1 nearer to the light source 9 and formed between one side surface of each ridge 8b and a plane T parallel to the flat surface 8e of the light guide panel 8 is in the range of 2.5° to 8°, and an angle K2 farther from the light source 9 and formed between the other side surface of each ridge 8b and the plane T is in the range of 40° to 50° so that light can efficiently be guided toward the liquid crystal cell 1. The light guide panel 8 is disposed with its flat surface 8e facing the liquid crystal cell 1.

When the liquid crystal display is used in a relatively bright environment, external light travels through the light guide panel 8 and falls on the front surface, i.e., the viewing-side surface, of the liquid crystal cell 1, the external light is reflected by the reflecting film 6 to enable a picture displayed on the liquid crystal cell 1 to be viewed through the light guide panel 8. When the liquid crystal display is used in a relatively dim environment, the light source 9 is turned on. Light emitted by the light source 9 is scattered by the irregularities 8d of the light guide panel 8 into the liquid crystal cell 1, the light is reflected by the reflecting film 6 to enable a picture displayed on the liquid crystal cell 1 to be viewed through the light guide panel 8. Since the light of a high intensity traveling through the light guide panel 8 is scattered toward the reflecting film 6, the liquid crystal cell 1 does not glare when the liquid crystal cell 1 is viewed from the front side thereof. The flat bottom surfaces 8c between the ridges 8b of the light guide panel 8 improve the visibility of pictures displayed on the liquid crystal cell 1 when viewed from the front side of the liquid crystal cell 1.

Figure 5:
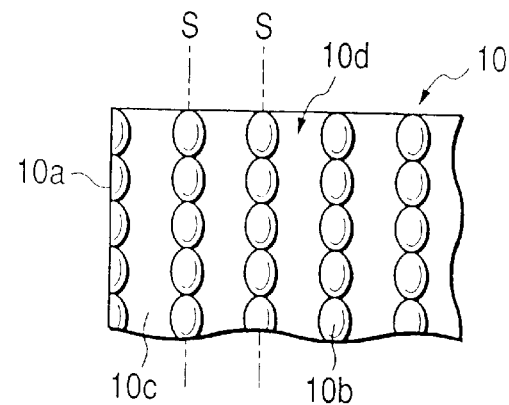
FIG. 5 is a fragmentary plan view of another light guide panel according to the present invention.
Figure 6:
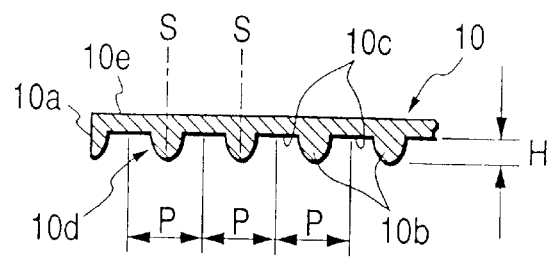
FIG. 6 is a fragmentary sectional view of the light guide panel of FIG. 5.
Figure 7:
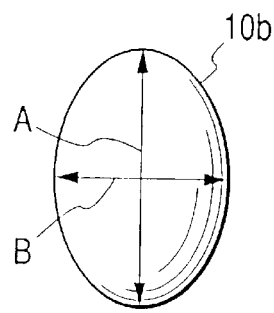
FIG. 7 is an enlarged plan view of a projection formed in the light guide panel of FIG. 5.
Figure 8:
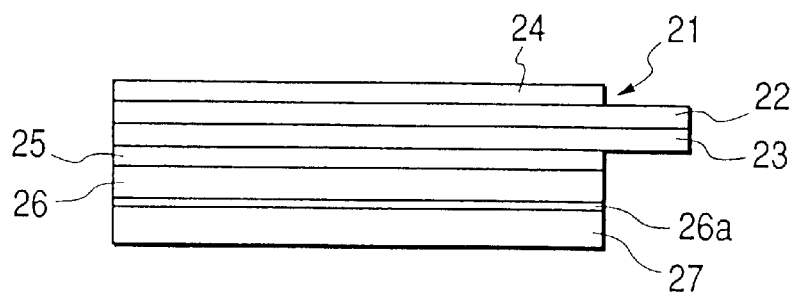
FIG. 8 is a typical side view of a conventional reflection type liquid crystal display.

The liquid crystal display of the present invention may be provided with a light guide panel 10 shown in FIGS. 5 to 7. The light guide panel 10 has a front surface provided with irregularities 10d, and a flat back surface 10e. The irregularities 10d have rows of elliptic projections 10b arranged at a pitch P in the range of 1 to 100 $\mu$m, and furrows formed between the adjacent rows of elliptic projections 10b and having flat bottom surfaces 10c. The plurality of elliptic projections 10b are arranged on lines S substantially parallel to a side surface 10a of the light guide panel 10. The height H of the projections 10b from the flat bottom surfaces 10c is increased gradually with distance from the side 10a of the light guide panel 10 near the light source 9. As shown in FIG. 7, each elliptic projection 10b has a major axis A of a length in the range of 1 to 100 $\mu$m. The elliptic projections 10b are arranged with their major axes aligned with the lines S. The major axes A is longer than a minor axes B orthogonal to the major axes A. The light guide panel 10 is disposed with its front back surface 10e facing the liquid crystal cell 1. The irregularities 10d including the elliptic projections 10b enable further efficient transmission of light through the light guide panel 10 toward the liquid crystal cell 1.

As is apparent from the foregoing description, in the liquid crystal display of the present invention, the light emitted by the light source 9 is guided toward the reflecting film 6 by the light guide panel 8 disposed on the front surface of the liquid crystal cell 1, the attenuation of the light is less than that in the conventional liquid crystal display.

Since the light of a high intensity emitted by the light source 9 is guided toward the reflecting film 6 by the light guide panel 8, pictures displayed on the liquid crystal display can be viewed without being bothered by glare.

Since the ridges 8b of the irregularities 8d of the light guide panel 8 have a triangular cross section and are arranged at a small pitch P in the range of 1 to 100 $\mu$m, the irregularities 8d are unrecognizable when viewed from the front side of the liquid crystal cell 1, so that pictures can be displayed in a high picture quality.

The light guide panel 8 provided with the ridges 8b having a triangular cross section and extended along the lines S parallel to the side surface 8a, and the light guide panel 10 provided with the elliptic projections 10b arranged along the lines S substantially parallel to the side surface 10a of the light guide panel 10 are capable of efficiently guiding the light emitted by the light source 9 toward the liquid crystal cell 1 to enable the liquid crystal cell 1 to display clear pictures.

Since each elliptic projection 10b has a major axis A arranged on the line S and having a length in the range of 1 to 100 µm, the elliptic projection becomes fine and efficiently guiding of the light emitted by the light source 9 can be attained, which enables the liquid crystal cell 1 to display clear pictures.

The flat surfaces 8c formed between the adjacent ridges 8b, and the flat surfaces 10c formed between the adjacent rows of elliptic projections 10b improve the visibility of pictures displayed on the liquid crystal cell 1 when viewed from the front side of the liquid crystal cell 1.

Although the invention has been described in its preferred embodiment with a certain degree of particularity, obviously many changes and variations are possible therein. It is therefore to be understood that the present invention may be practiced otherwise than as specifically describe herein without departing from the scope and spirit thereof.

What is claimed is:

1. A liquid crystal display comprising:
   a liquid crystal cell having a front surface serving as a viewing-side surface, and a back surface;
   a light guide panel having a first major surface provided with spaced parallel linear projections and a second major surface finished in a smooth flat plane;
   a light source disposed near the light guide panel such that light emitted from the light source is incident on a side surface of the light guide panel;
   an intermediate layer disposed between the front surface of the liquid crystal cell and the second major surface of the light guide panel; and
   a reflecting member provided on the liquid crystal cell;
   wherein the irregularities are ridges extended along lines substantially parallel to the side surface of the light guide panel and have a scalene triangular cross section in which a first interior angle, defined by a first side of the triangle disposed more proximate to the light source and a plane parallel to the second major surface of the light guide panel, is smaller than a second interior angle, defined by a second side of the triangle disposed more distal to the light source and a plane parallel to the second major surface of the light guide panel; and
   incident light from the light source is guided into the liquid crystal cell by the ridges, reflected by the reflecting member, travels though the light guide panel, and emerges outside the liquid crystal display.

2. The liquid crystal display according to claim 1 wherein the light source is disposed beside the side surface of the light guide panel, and the projections of the light guide panel are formed at a pitch in the range of 1 to 100 µm.

3. A liquid crystal display comprising:
   a liquid crystal cell having a front surface serving as a viewing-side surface, and a back surface;
   a light guide panel having a first major surface provided with spaced parallel linear projections and a second major surface finished in a smooth flat plane;
   a light source disposed near the light guide panel such that light emitted from the light source is incident on a side surface of the light guide panel;
   an intermediate layer disposed between the front surface of the liquid crystal cell and the second major surface of the light guide panel; and
   a reflecting member provided on the liquid crystal cell;
   wherein the projections are elliptic projections having major axes and continuously connected along lines substantially parallel to the side surface of the light guide panel; and
   incident light from the light source is guided into the liquid crystal cell by the elliptic projections, reflected by the reflecting member, travels though the light guide panel, and emerges outside the liquid crystal display.

4. The liquid crystal display according to claim 3, wherein the elliptic projections are arranged with their major axes aligned with lines substantially parallel to the side surface of the light guide panel, and the length of the major axes of the elliptic projections is in the range of 1 to 100 µm.

5. The liquid crystal display according to claim 1, wherein flat surfaces are formed between the adjacent ridges, respectively.

6. The liquid crystal display according to claim 1, the first interior angle being between 2.5° and 8° and the second interior angle being between 45° and 50°.

7. The liquid crystal display according to claim 1, a height of the ridges gradually increasing with distance from a ridge disposed closest to the light source.

8. The liquid crystal display according to claim 1, the intermediate layer comprising a polarizer.

9. The liquid crystal display according to claim 3, the intermediate layer comprising a polarizer.

10. The liquid crystal display according to claim 1, the reflecting member being provided outside of the liquid crystal cell.

11. The liquid crystal display according to claim 3, the reflecting member being provided outside of the liquid crystal cell.

12. The liquid crystal display according to claim 10, the reflecting member being arranged on the back surface of the liquid crystal cell.

13. The liquid crystal display according to claim 11, the reflecting member being arranged on the back surface of the liquid crystal cell.

14. The liquid crystal display according to claim 1, the reflecting member being provided between the front surface of the liquid crystal cell and back surface of the liquid crystal cell.

15. The liquid crystal display according to claim 3, the reflecting member being provided between the front surface of the liquid crystal cell and back surface of the liquid crystal cell.

16. The liquid crystal display according to claim 8, the reflecting member being arranged on the back surface of the liquid crystal cell.

17. The liquid crystal display according to claim 9, the reflecting member being arranged on the back surface of the liquid crystal cell.

18. The liquid crystal display according to claim 8, the reflecting member being provided between the front surface of the liquid crystal cell and back surface of the liquid crystal cell.

19. The liquid crystal display according to claim 9, the reflecting member being provided between the front surface of the liquid crystal cell and back surface of the liquid crystal cell.

20. The liquid crystal display comprising:
   a liquid crystal cell; and
   a light guide panel disposed on a viewing-side of the liquid crystal cell and having a first surface facing the liquid crystal cell and a second surface which is a reverse side of the first surface;
   wherein the first surface of the light guide panel is a plane and the second surface of the light guide panel is a prism array comprising triangular-shaped prisms, at least one of the prisms having a vertex with unequal angles between sides of the prism that form the vertex and a plane parallel to the first surface of the light guide panel.

21. The liquid crystal display according to claim 20, wherein each prism has a vertex with unequal angles between sides of the prism that form the vertex and the plane parallel to the first surface of the light guide panel.

22. The liquid crystal display according to claim 20, wherein the triangular-shaped prisms are scalene triangular-shaped prisms.

23. The liquid crystal display according to claim 20, wherein one of the unequal angles is between 2.5° and 8° and another of the unequal angles is between 45° and 50°.

24. The liquid crystal display according to claim 20, further comprising a light source disposed near the light guide panel such that light emitted from the light source is incident on a side surface of the light guide panel, wherein a height of the prisms gradually increases with distance from prisms disposed closest to the light source.

25. The liquid crystal display according to claim 21, wherein the triangular-shaped prisms are scalene triangular-shaped prisms.

26. The liquid crystal display according to claim 21, wherein one of the unequal angles is between 2.5° and 8° and another of the unequal angles is between 45° and 50°.

27. The liquid crystal display according to claim 21, further comprising a light source disposed near the light guide panel such that light emitted from the light source is incident on a side surface of the light guide panel, wherein a height of the prisms gradually increases with distance from prisms disposed closest to the light source.

28. The liquid crystal display according to claim 25, wherein one of the unequal angles is between 2.5° and 8° and another of the unequal angles is between 45° and 50°.

29. The liquid crystal display according to claim 25, further comprising a light source disposed near the light guide panel such that light emitted from the light source is incident on a side surface of the light guide panel, wherein a height of the prisms gradually increases with distance from prisms disposed closest to the light source.

30. The liquid crystal display according to claim 28, further comprising a light source disposed near the light guide panel such that light emitted from the light source is incident on a side surface of the light guide panel, wherein a height of the prisms gradually increases with distance from prisms disposed closest to the light source.

31. A liquid crystal display comprising an illumination unit having a light guide panel disposed on a viewing side of the liquid crystal display, the light guide panel including a side surface on which light is incident, a first surface facing the liquid crystal display, and a second surface which is a reverse side of the first surface;

wherein the first surface is a plane, and the second surface includes a prism array that has scalene triangular-shaped prisms; and wherein the prism array guides the light from the side surface toward the liquid crystal display and transmits light from the liquid crystal display.

* * * * *